Nov. 6, 1928.
P. RICHERT
1,691,017
RECORDING METER
Filed Dec. 18, 1923
3 Sheets-Sheet 1
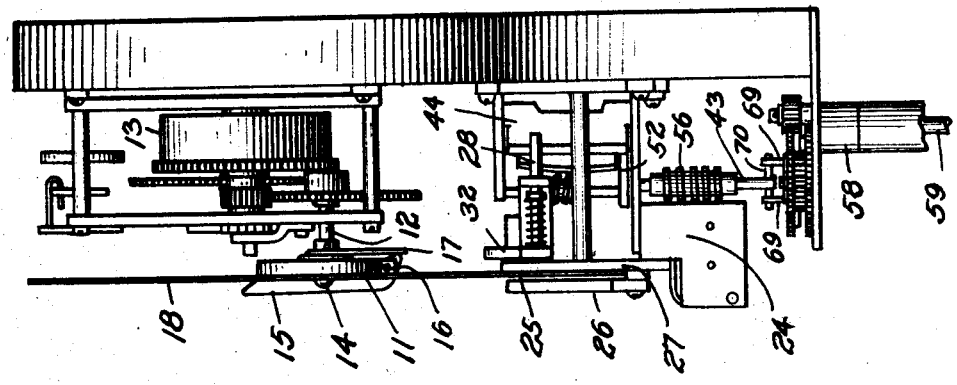
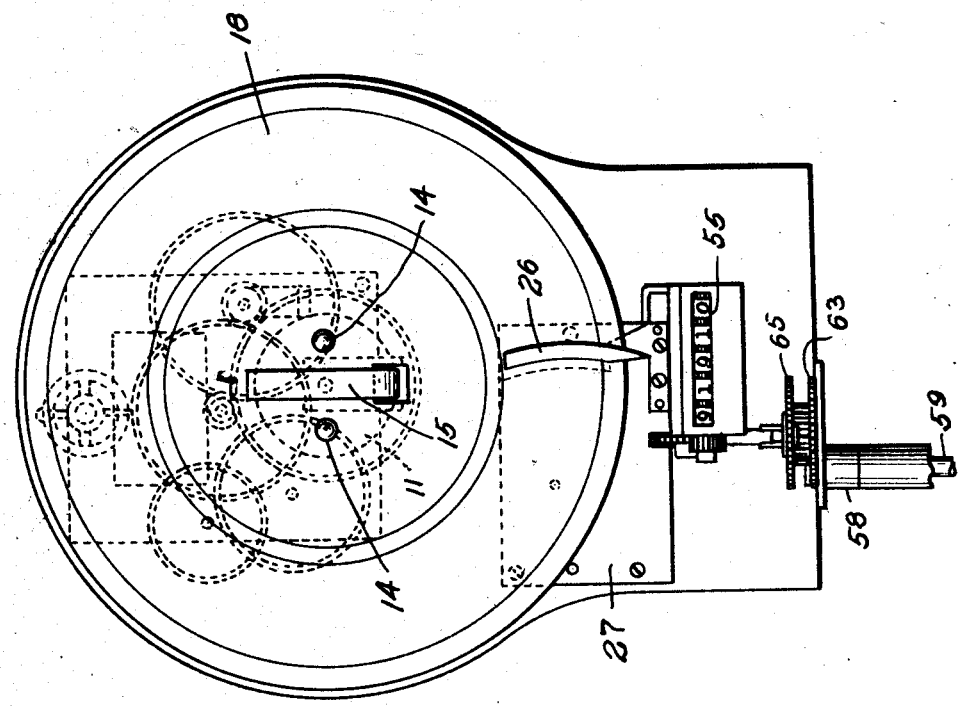
WITNESSES
INVENTOR
Paul Richert
By Green and McAllister
His Attorneys

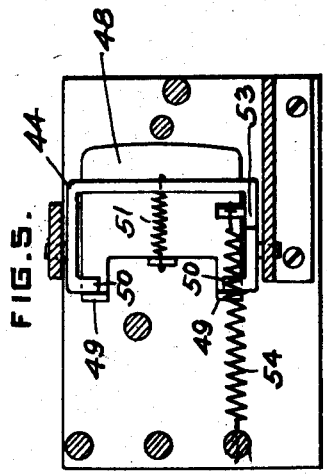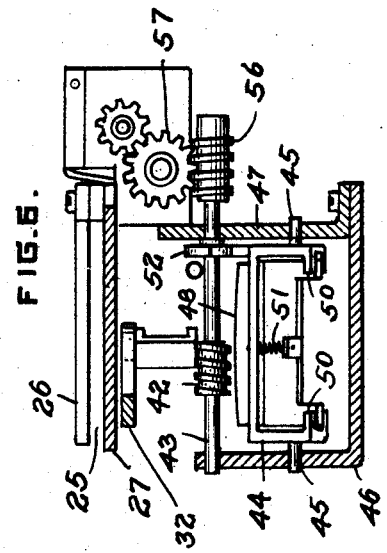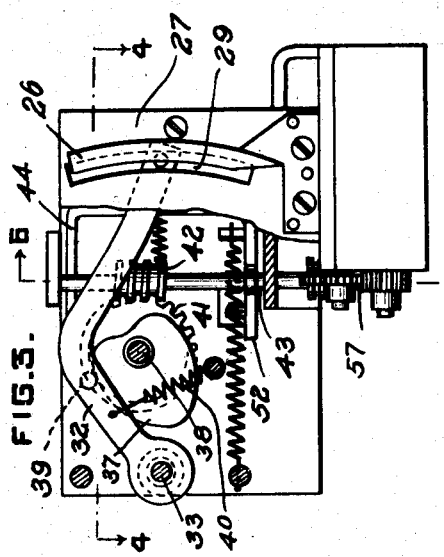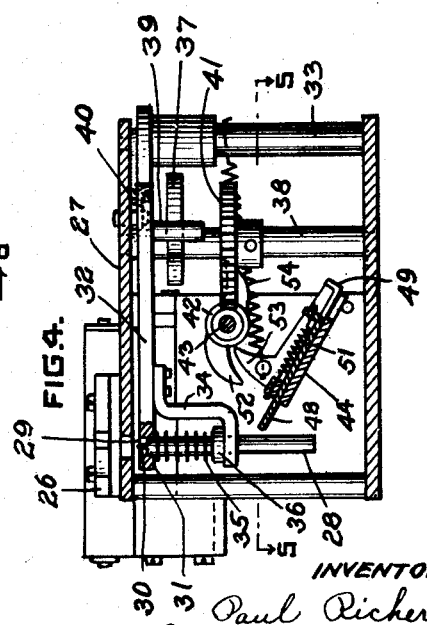

Nov. 6, 1928.　　　　　　　　　　　　　　　　1,691,017
P. RICHERT
RECORDING METER
Filed Dec. 18, 1923　　　3 Sheets-Sheet 3
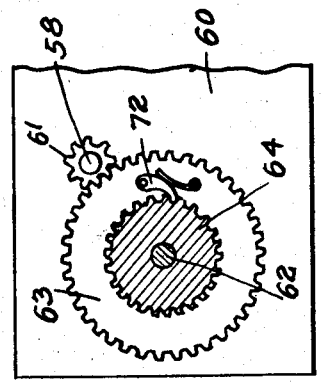
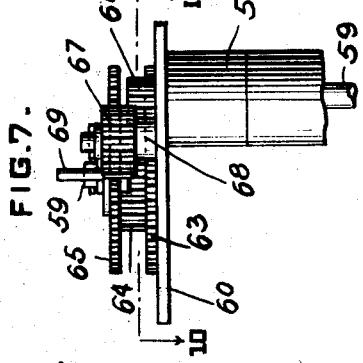
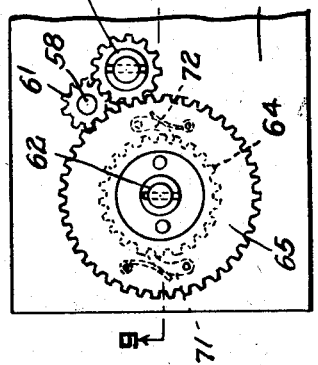
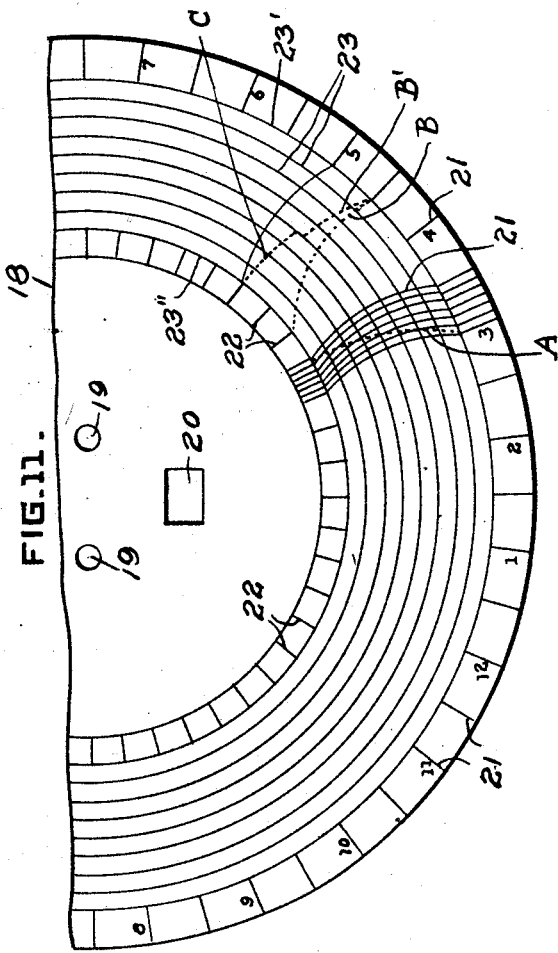
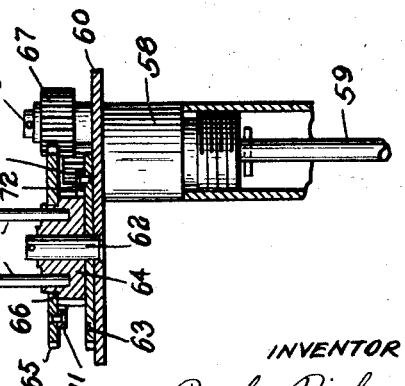
WITNESSES
J. Herbert Bradley
INVENTOR
Paul Richert
By Green and McCollister
His Attorneys Patented Nov. 6, 1928.

1,691,017

UNITED STATES PATENT OFFICE.

PAUL RICHERT, OF NEW YORK, N. Y., ASSIGNOR TO PITTSBURGH TAXIMETER COMPANY, A CORPORATION OF PENNSYLVANIA.

RECORDING METER.

Application filed December 18, 1923. Serial No. 681,373.

This invention relates to recording devices and more particularly to that type of recording devices used on vehicles for the purpose of obtaining a chart showing the manner of operation of the vehicle, that is to say, a chart which shows at a glance the distance traveled, the time consumed in traveling that distance and the time which elapsed between trips or during which the vehicle was stationary.

An object of this invention is to provide a recording device of the above type, adapted for use upon vehicles, which will produce a clear, accurate and legible chart showing the operations of the vehicle over a given period of time, for example, twenty-four hours.

A further object is to provide a connection between the drive shaft of the recording device and a moving part of the vehicle of such construction that the drive shaft will be rotated one direction only irrespective of the direction of movement of the vehicle so that the recording device will be actuated regardless of whether the vehicle is moving forward or backward.

A still further object is to provide an improved recording device in which an improved form of perforator is made to form a series of perforations in the chart showing the operation of the vehicle and in which a simple, rugged and positive mechanism is operated by the movement of the vehicle to drive the perforator.

A still further object is to provide a recording device in which a plurality of duplicate charts may be made simultaneously.

A still further object is to provide an improved form of chart and an improved holder for supporting the chart.

These and other objects, which will appear obvious to those skilled in this particular art, I accomplish by means of my invention, one embodiment of which is shown, for the purpose of illustration, in the accompanying drawings, in which Figure 1 is a front elevation of a recording device construction in accordance with this invention, Fig. 2 is a side elevation of the structure shown in Fig. 1, Fig. 3 is a front elevation of the recording mechanism showing the front cover plate partly broken away so as to show the detail arrangement of the recording mechanism, Fig. 4 is a cross section taken on the line 4—4 of Fig. 3, Fig. 5 is a section on the line 5—5 of Fig. 4 showing the construction of the perforator projector, Fig. 6 is a section on the line 6—6 of Fig. 3, Fig. 7 is a view in elevation of the mechanism for driving the recording device from a moving part of the vehicle, Fig. 8 is an end view of the structure shown in Fig. 7, Fig. 9 is a section on the line 9—9 of Fig. 8, Fig. 10 is a section on the line 10—10 of Fig. 7 and Fig. 11 is a view in elevation of a part of my improved form of chart used with the recording device.

In the device chosen for illustration I have shown a rotatable chart holder adapted to hold a disc shaped chart. The chart holder is driven, preferably, by an ordinary clock movement so arranged that the holder makes one revolution every twenty-four hours. The chart is in the form of a disc having a part of its face divided into radial sections corresponding to any desired intervals of time. The face of the chart is also provided with a series of concentric circles so arranged that the spaces on the chart face between the circles represent a given distance traveled by the vehicle. If desired two or more charts may be produced simultaneously merely by superimposing the required number on the holder at the same time.

The chart holder is so arranged with relation to the recording device that the ruled part of the chart face is rotated past a perforator which is adapted to oscillate in a generally radial direction back and forth across the concentric circles of the chart face. The perforator is driven from a moving part of the vehicle and is adapted to form a series of perforations in the chart in accordance with the vehicle movement and means are provided for operating the drive shaft of the perforator in one direction only, irrespective of the direction of movement of the vehicle, so that the perforator will be operated in such a manner as to provide a record of the movement of the vehicle regardless of whether the vehicle moves forward or backward.

The illustrated embodiment of my invention includes a rotatable chart holder 11 secured to a shaft 12 which is rotated by an ordinary clock movement 13. The face of the chart holder is provided with pins 14 and a snap fastener 15 pivoted at one side of the holder on the pivot 16. A spring 17 is adapted to press the snap fastener against the face of the holder 11. A disc-shaped chart 18 is mounted upon the face of the holder 11. The chart has perforations 19 adapted to accommodate the pins 14 and a rectangular perforation 20 is provided through which the snap fastener 15 extends. As above noted, a plurality of charts may be produced simultaneously by securing the desired number in superposed relation in the holder 11.

The chart, see Fig. 11, is provided with radial lines 21 and 22 which form sections indicating any desired length of time. The outer part of the face of the chart is ruled with concentric circles 23, the distance between which indicates a certain distance of travel of the vehicle. In this case each space represents one quarter of a mile. It will, therefore, be seen that the distance on the illustrated chart between the outer circle 23′ and the inner circle 23″ represents two miles traveled by the vehicle.

The chart 18 is rotated by the holder 11 so that the ruled or recording section of the face thereof passes through, or by, the recording device 24. In the present instance it passes through a slot 25 formed between an arcuate perforator stop 26 and the outer face of the cover plate 27 of the perforating mechanism to which the stop is secured.

A perforator 28, see Fig. 4, is adapted to be periodically projected through an arcuate slot 29, formed in the cover plate 27 adjacent the stop bar 26, so as to form a series of perforations in the recording chart in timed relation to the movement of the vehicle. The perforator is in the form of a rod having at one end a sharp point 30 adapted to pierce the chart and a stop shoulder 31 which surrounds the base of the point and which is adapted to contact with the edge of the perforator stop 26 past which the point is projected in piercing the chart. The stop 26 thus forms a backing for the chart and as the point 30 is driven beyond the edge of the stop 26, which latter contacts with the perforator shoulder 31, piercing of the chart is insured. The perforator is supported in a holder 32 pivoted to a shaft 33 about which it is adapted to be oscillated so as to move the perforator back and forth from one end of the arcuate slot 29 to the other. A bracket 34 is mounted on the supporting arm 32 to maintain the perforator 28 in operative position, and a coil spring 35 is placed around the perforator 28 between the upper end of the oscillating support 32 and a collar 36 formed on the perforator so as to ordinarily maintain the perforator in retracted position.

The holder 32 is oscillated about the shaft 33 by a cam 37 mounted on a rotatable cam shaft 38 and contacting with a pin 39 secured to the support 32. A spring 40 is provided for maintaining the pin 37 in contact with the cam 35. The cam is rotated by a worm wheel 41 secured to the shaft 38 and driven by a worm 42 on the drive shaft 43 of the perforator.

The perforator 28 is periodically actuated by a perforator projector 44 adapted to oscillate about supporting trunnions 45 mounted in the side plates 46 and 47 of the projector supporting frame. The projector 44 is provided with a contact plate 48 slidably mounted in the projector frame 44. Stops 49 are formed on the contact plate and are adapted to cooperate with lugs 50 formed on the projector frame 44 for limiting the outward movement of the contact plate. A coil spring 51 tends to keep the contact plate 48 in its extreme outward position. The projector 44 is adapted to be oscillated on its supporting trunnions by a double cam 52 secured to the drive shaft 43. A projecting nose 53 is formed on the projector frame to cooperate with the cam 52, see Fig. 4. A spring 54 is provided to maintain the nose 53 in contact with the cam 52. It is obvious that oscillation of the projector frame 44 by the cam 52 will move the contact plate against the perforator 28. In riding along the projector the contact plate 48 will be depressed against the tension of the spring 51 until it passes the end of the projector. The spring 51 will then snap the contact plate outwardly so that when the high point of the cam 52 has passed the nose 53 the projector frame will be snapped forwardly by the spring 54 and the contact plate 48 will drive the perforator outwardly through the slot 29 and cause the point of the perforator to pierce the chart 18 adjacent the perforator stop 26 against which the shoulder 31 strikes. The arcuate perforator stop 26 forms a backing for the chart adjacent the perforator point and insures piercing of the chart.

If desired a set of counters 55 may be operated by the drive shaft 43 through the medium of a worm 56 secured to the drive shaft for driving the worm wheel 57 which operates the counters.

Obviously the drive shaft 43 must be operated in one direction only. This drive shaft is connected to a moving part of the vehicle and I have provided a mechanism for driving the shaft in the proper direction irrespective of whether the vehicle is moving forward or backward.

This mechanism, see Figs. 7 to 10, includes a shaft 58 adapted to be driven by a shaft 59 which is connected to a moving part of the vehicle. The shaft 58 is rotatably supported in a plate 60 and has secured thereto a pinion 61. A stub shaft 62 is mounted on the plate 60 and rotatably supports a gear 63 in mesh with the pinion 61. A ratchet wheel 64 is rotatably mounted on the stub shaft 62 adjacent the gear 63 and a second gear 65 is rotatably mounted on a shoulder 66 formed in the outer face of the ratchet wheel 64. The gear 65 is driven in an opposite direction to the gear 63 by a reversing pinion 67 in mesh with the gear 65 and driven by the pinion 61.

The pinion 67 is mounted upon the stub shaft 68 on the supporting plate 60. The ratchet wheel 64 is adapted to drive the shaft 43 through the medium of diametrically opposed pins 69 which project outwardly from the face of the ratchet wheel and contact with a cross pin 70 secured in the end of the shaft 43, see Fig. 2. A pawl 71 is secured to the inner face of the gear 65 and adapted to contact with the teeth of the ratchet wheel 64. A second pawl 72 is secured to the inner face of the gear 63 so as to contact with the teeth of the ratchet wheel. Obviously rotation of the pinion 61 by the movement of the vehicle will rotate the gear 63 and its supported pawl in one direction while the outer gear 65 and its supported pawl 71 are rotated in the opposite direction through the intermediate pinion 67. If the gear 63 is rotated to the right in Fig. 8 the pawl 72 will drive the ratchet wheel to the right while the pawl 71 on the gear 65 simply drags over the teeth of the ratchet. If the vehicle is moved in the opposite direction so as to rotate the pinion 61 in a reverse direction the gear 63 and pawl 72 will be rotated to the left while the gear 65 and pawl 71 will be rotated to the right and the ratchet wheel will be driven also to the right, this time by the pawl 71. In other words the ratchet wheel and the shaft 43 are always driven in one direction irrespective of the direction of movement of the vehicle.

In operation the chart or charts are first set so that the perforator is opposite the line 21 on the chart which corresponds to the time of day at which the vehicle is starting out. The chart is rotated past the perforator by the rotation of the holder 11 which is driven by the clock movement. In Fig. 11 the lines 21 which extend across the concentric circles 23 indicate five minute intervals. Upon movement of the vehicle the drive shaft 43 is rotated. Rotation of the drive shaft causes the perforator holder 32 and the perforator to oscillate back and forth across the face of the chart in accordance with the movement of the vehicle. This is accomplished by the rotation of the cam 37 as above described. During this oscillation the perforator will be periodically actuated through the oscillation of the projector 44 and the contact plate 48 by the cam 52 on the drive shaft 43 and a series of perforations showing the operation of the vehicle thus formed in the chart face.

The space between each circle 23 on the chart 18, see Fig. 11, in this case indicates one quarter of a mile. Therefore the illustrated chart shows that the vehicle started out at three o'clock, the point where the line of perforations A begins, and traveled steadily for two miles which distance was covered by 3:30. In other words the vehicle was traveling steadily for one half an hour at the rate of four miles an hour. The second line of perforations B begins at the inner corresponding circle showing that the vehicle was stationary for one half an hour after traveling two miles. The lines of perforations B and B', which start at the radial line indicating 4 o'clock show that the vehicle was stationary from 3:30 until 4 o'clock at which time it again started and traveled the next two miles in 30 minutes at the rate of four miles an hour. At this point the line of perforations B' shows that the speed was accelerated somewhat and the next mile was traveled in a shorter time. After traveling three miles the vehicle was stopped for about 5 minutes when it again traveled for a mile as shown by the perforated line C at a greater speed finishing its travel at 5 o'clock.

While I have illustrated and described one form of my invention I do not desire to be limited thereto but what I claim and desire to secure by Letters Patent is:

1. In a device of the character described, a perforator adapted to form a series of perforations in a recording chart, a pivoted perforator projector provided with a sliding contact plate and means for oscillating said projector so as to bring said plate into contact with and actuate said perforator.

2. In a device of the character described, a perforator adapted to form a series of perforations in a recording chart, a pivoted perforator projector provided with a sliding contact plate, a cam for moving said projector into operative relation with said perforator and a spring for moving said projector so as to bring said plate into contact with and actuate said perforator.

3. In a device of the character described, a perforator adapted to form a series of perforations in a recording chart, a pivoted perforator projector normally lying at one side of the path of movement of said perforator, means for moving said projector into operative relation with said perforator and a spring for advancing said projector so as to operate said perforator.

4. In a device of the character described, a perforator adapted to form a series of perforations in a recording chart, a pivoted perforator projector provided with a sliding contact plate and adapted to normally lie at one side of said perforator, means for moving said projector into operative position at the rear of said perforator and a spring for moving said projector so as to bring said plate into contact with and actuate said perforator.

5. In a device of the character described, a perforator adapted to form a series of perforations in a recording chart, a drive shaft, a pivoted perforator projector normally lying at one side of the path of movement of said perforator, a cam on said shaft for moving said projector into operative position at the rear of said perforator and a spring for advancing said projector so as to actuate said perforator.

6. In a device of the character described, a perforator adapted to form a series of perforations in a recording chart, a pivoted arm for supporting said perforator, a drive shaft, means on said shaft for oscillating said arm so as to move said perforator across the face of the recording chart, a pivoted perforator projector normally lying at one side of the path of movement of said perforator, a cam on said shaft for moving said projector into operative position at the rear of said perforator and a spring for advancing said projector so as to operate said perforator.

7. In a device of the character described, a perforator provided with a perforating point and a surrounding shoulder, a stop bar mounted in operative relation to said perforator, means for positioning a chart between said perforator and said bar and mechanism for causing said point to be forcibly projected through said chart and for causing said shoulder to press said chart against said bar.

8. The combination in a recording device of a chart holder provided with projecting pins, a chart having perforations for receiving said pins when said chart is mounted on said holder, securing means eccentrically mounted on said holder and an opening in said chart through which said securing means extends.

9. The combination in a recording device of a chart holder provided with projecting pins, a plurality of charts having preforations for receiving said pins when said chart is mounted on said holder, spring pressed securing means eccentrically mounted on said holder and an opening in said charts through which said securing means extends, whereby said plurality of charts are positively maintained on said holder in identical superimposed position.

In testimony whereof, I have hereunto subscribed my name this 10th day of December, 1923.

PAUL RICHERT.